(12) United States Patent
Marrazzo et al.

(10) Patent No.: US 12,111,083 B1
(45) Date of Patent: Oct. 8, 2024

(54) MAGNETOCALORIC GENERATOR

(71) Applicant: magnoric, Duppigheim (FR)

(72) Inventors: Frédéric Marrazzo, Vendenheim (FR); Christian Muller, Strasbourg (FR); Michel Risser, Oberhaslach (FR); Zoé Till, Strasbourg (FR)

(73) Assignee: magnoric, Duppigheim (FR)

( * ) Notice: Subject to any disclaimer, the term of this patent is extended or adjusted under 35 U.S.C. 154(b) by 0 days.

(21) Appl. No.: 18/707,770

(22) PCT Filed: Dec. 8, 2022

(86) PCT No.: PCT/EP2022/085011
§ 371 (c)(1),
(2) Date: May 6, 2024

(87) PCT Pub. No.: WO2023/110628
PCT Pub. Date: Jun. 22, 2023

(30) Foreign Application Priority Data

Dec. 15, 2021 (FR) .................................. 2113535

(51) Int. Cl.
*F25B 21/00* (2006.01)
*H01F 1/01* (2006.01)
*H01F 7/02* (2006.01)

(52) U.S. Cl.
CPC ............. *F25B 21/00* (2013.01); *H01F 1/012* (2013.01); *H01F 7/0205* (2013.01); *F25B 2321/002* (2013.01)

(58) Field of Classification Search
CPC .. F25B 2321/002; F25B 21/00; H01F 7/0205; H01F 1/012
See application file for complete search history.

(56) References Cited

U.S. PATENT DOCUMENTS 5,880,548 A * 3/1999 Lamb ................... H02K 49/046
310/78
6,791,219 B1 * 9/2004 Eric ..................... H02K 11/215
310/68 B (Continued)

FOREIGN PATENT DOCUMENTS

CN 113314292 A 8/2021
FR 2904098 A1 1/2008

(Continued)

OTHER PUBLICATIONS

International Search Report, corresponding International Application No. PCT/EP2022/085011, mailing date Mar. 14, 2023.

(Continued)

*Primary Examiner* — Filip Zec
(74) *Attorney, Agent, or Firm* — MARSHALL, GERSTEIN & BORUN LLP

(57) ABSTRACT

The invention relates to a magnetocaloric generator includes a set of porous active elements based of MCM materials, and a magnetic arrangement. The magnetic arrangement includes two superposed magnetic rotors, namely an external magnetic rotor and an internal magnetic rotor delimiting an air gap between them, and includes one same number of magnetic poles. The set of active elements includes a stator disposed in said air gap. The active elements extending axially in said stator enable a two-directional axial circulation of a heat-transfer fluid between a hot end and a cold end of said generator. The external magnetic rotor is advantageously coupled, on the one hand, to an electrical machine by a mechanical coupling, and on the other hand, to said internal magnetic rotor by a magnetic coupling, such that said rotors move in one same direction of rotation and are magnetically synchronous.

16 Claims, 9 Drawing Sheets

(56) References Cited

U.S. PATENT DOCUMENTS

| | | | | |
|---|---|---|---|---|
| 9,184,649 B2* | 11/2015 | Webster | ............... | H02K 16/00 |
| 10,218,253 B2* | 2/2019 | Lalesse | ................ | H02K 7/06 |
| 2015/0042182 A1* | 2/2015 | Glover | ................ | H02K 29/12 |
| | | | | 310/46 |
| 2020/0161948 A1* | 5/2020 | Ukaji | ................ | H02K 1/27 |

FOREIGN PATENT DOCUMENTS

| WO | WO-2009136022 A2 | 11/2009 |
|---|---|---|
| WO | WO-2019110193 A1 | 6/2019 |

OTHER PUBLICATIONS

International Preliminary Report on Patentability, corresponding international application No. PCT/IEP2022/085011, Aug. 3, 2023.

* cited by examiner

MAGNETOCALORIC GENERATOR

TECHNICAL FIELD

The present invention relates to a magnetocaloric generator comprising at least one set of active elements based of Magnetocaloric Materials (MCM), and a magnetic arrangement arranged to be movable with respect to the set of active elements, said magnetic arrangement comprising two superposed magnetic rotors, namely an external magnetic rotor and an internal magnetic rotor delimiting an air gap between them, said external magnetic rotor and said internal magnetic rotor comprising one same number of magnetic poles, said set of active elements constituting a stator disposed in said air gap, and said active elements extending longitudinally in said stator between a hot end and a cold end of said generator.

BACKGROUND

The technology of the ambient temperature magnetic refrigeration has been known for more than forty years, and its advantages are known in terms of energy efficiency and of environmental impacts reduced with respect to the conventional technologies based on the compression and the expansion of a refrigerant gas. Also, its limits as regards its caloric power or energy conversion are also known. Subsequently, research performed in this field, all tend to improve the performance of the magnetocaloric generators, by playing on the parameters of the different constitutive elements, such as the intensity and the quality of the magnetic field, the performance of the magnetocaloric material of the active elements, the heat exchange surface between the heat-transfer fluid and the active elements, the performance of the heat exchangers, etc.

Today, developments relate to the optimisation of these generators, in view, on the one hand, of being able to manufacture them in large series and, on the other hand, to guarantee them a significant service life. In addition to having to reach a commercially interesting energy efficiency, these generators must have a relatively small size or bulk, to be able to integrate them in commercial applications having bulk limitations.

Publications WO2009/087310 and WO2015/079313 belonging to the applicant give a perception of the technical developments already applied to magnetocaloric generators, which can be further improved.

Publication CN 113 314 292 A describes a Halbach-type magnetic assembly for a magnetic refrigeration generator. It comprises two coaxial magnetic rotors, namely an outer rotor and an inner rotor, separated by an air gap, wherein active elements in the form of magnetocaloric material compartments are disposed. The rotors are driven in the opposite direction synchronously by a motor and a mechanical drive mechanism. The counter-rotating driving of the rotors makes it possible to create a magnetic field variation applied to the active elements located in the air gap. However, this principle does not make it possible to utilise any potential energy of the magnets of the rotors. Indeed, over a rotation fraction, the rotors are not in phase opposition, nor in phase adjustment, which constitutes a long and inoperable transition phase from the standpoint of MCMs, disadvantageous for the performance of the generator. When the magnets are in phase opposition over half of an active cycle time, the potential energy of the magnets is totally unutilised and consequently, the magnets are poorly valued. Furthermore, this principle is the source of eddy currents within the structure of the magnetic rotors that must be managed, and exposes the magnets to demagnetisation risks by exceeding their coercive magnetic field.

Publication WO 2019/110193 A1 describes a composite matrix based of magnetocaloric materials. These materials are present in the form of particles held together by a coating based of another non-magnetocaloric material, such as nickel. The coated particles together define cavities for the circulation of a liquid. The result is an amorphous porous matrix, i.e. random and non-regular, inevitably generating load losses, which are damaging for the performance of a magnetic refrigeration generator.

SUMMARY OF THE DISCLOSURE

The present invention aims to propose a new generation of magnetocaloric generators aiming to optimise the performance of the generator, maximise the intensity and the magnetic field variation applied to the active elements, optimise the response of said active elements, optimise the utilisation of the magnetic energy of the magnets (BHmax), reduce the load losses and the friction sources, avoid the eddy currents, reduce the energy consumption, personalise the technical features of the generator to achieve the targeted aims and thus response to a wide range of applications: heating, cooling, air conditioning, reversible heat pump, thermomagnetic motor, etc. This further relates to a reversible converter enabling the pumping of a thermal energy from a cold source to a hot source using a mechanical and/or electrical work, or the conversion of thermal energy in the form of a mechanical and/or electrical work temperature difference; the conversion between mechanical and electrical energy is, in this case, ensured by a conventional electromagnetic machine such as an alternator, a dynamo, an electrical motor, etc.

With this in mind, the invention relates to a generator of the type indicated in the preamble, characterised in that one of said external or internal magnetic rotors is coupled, on the one hand, to an electrical machine by a mechanical coupling, and on the other hand, to the other of said internal or external magnetic rotors by a magnetic coupling, such that said rotors move in one same direction and are magnetically synchronous.

In a preferred embodiment of the invention, said generator has a cylindrical configuration, the external and internal magnetic rotors are concentric about their axis of rotation, and said stator has an annular shape, concentric with said external and internal magnetic rotors.

Said external magnetic rotor is preferably coupled to said electrical machine. In this case, it comprises a peripheral toothed ring, and said mechanical coupling between said external magnetic rotor and said electrical machine comprises a toothed belt transmission meshing said toothed ring.

In the preferred embodiment of the invention, said generator comprises at least means for rotatably guiding said external magnetic rotor and said internal magnetic rotor carried by a casing, and said means for rotatably guiding said external magnetic rotor comprise peripheral guiding members, mounted in the ends of said external magnetic rotor and arranged to circulate on a guiding path belonging to said casing.

Said guiding members are advantageously mounted on said external magnetic rotor in peripheral sectors located outside of said magnetic poles. And said guiding path is advantageously provided on a guiding ring added to said casing, said guiding ring being able to be made of a material of hardness greater than that of the material of said casing.

Absolutely advantageously, said magnetic arrangement is of modular construction and comprises an assembly of at least two basic modules stacked in a longitudinal direction, each basic module comprises a portion of said external magnetic rotor and a portion of said internal magnetic rotor, and the number of basic modules defines the length of said magnetic arrangement and is determined according to the power and/or to the temperature difference targeted for said generator.

Said basic modules preferably comprise complementary interlocking shapes arranged to, on the one hand, centre said basic modules with respect to said axis of rotation and index the angular position of said basic modules against one another.

According to the variants of embodiments of the invention, said magnetic arrangement can comprise, facing said air gap, a magnetic field uniforming device superposed to said magnetic poles of said external magnetic rotor and/or said internal magnetic rotor.

In the preferred embodiment of the invention, said active elements are porous and each passed through by a heat-transfer circuit enabling an alternative circulation of a heat-transfer fluid from said hot end to said cold end in a first work cycle, and conversely, from said cold end to said hot end in a second work cycle of said generator. In this case, the orientation of the circulation of the heat-transfer fluid is advantageously perpendicular to the orientation of the magnetic field lines generated by said magnetic poles of said magnetic arrangement.

Preferably, the number of active elements of said assembly is a multiple of the number of magnetic poles of said magnetic arrangement, and said active elements are disposed side-by-side over the circumference of said stator.

Each active element can comprise a longitudinal material carrier, housed in said stator. In this case, the material carriers can have a cross-section chosen from among a square, a rectangle, a trapezium. Furthermore, the length of said material carriers is advantageously determined according to the length of said magnetic arrangement and to the power, the effectiveness and/or the temperature difference targeted for said generator.

In the preferred embodiment of the invention, the material carrier of each active element comprises an inner housing arranged to receive at least one MCM, and at least one fluid connector to each of its ends, arranged to connect said active element to said heat-transfer circuit. It can further comprise at least one distributor in each end zone between said fluid connector and said inner housing.

Said active elements can comprise at least one porous MCM block in an amorphous form, of regular material strips or structures, oriented parallel to the longitudinal axis of said material carrier, and spaced apart from one another by an interval. In this case, the intervals advantageously constitute a set of longitudinal channels enabling a two-directional circulation of said heat-transfer fluid through each active element.

Said active elements can comprise one or more porous MCM blocks of one same MCM or of different MCMs separated from one another by joining wedges, or also of different MCM compositions dosed and organised to obtain a variable Curie temperature. The different MCMs or MCM compositions are stored or ordered preferably according to an increasing or decreasing Curie temperature, evolving stepwise or continuously.

BRIEF DESCRIPTION OF THE DRAWINGS

The present invention and its advantages will best appear in the description below of several embodiments given as non-limiting examples, in reference to the accompanying drawings, wherein.

DETAILED DESCRIPTION

In the examples of embodiments illustrated, identical elements or parts have the same reference numbers. Furthermore, the terms which have a relative meaning, such as vertical, horizontal, right, left, front, rear, above, below, etc. must be interpreted under normal use conditions of the invention, and such as represented in the figures. The axes X, Y and Z are themselves defined by an orthonormal system illustrated in FIG. 1. Moreover, the geometric positions indicated in the description and the claims, such as "perpendicular", "parallel", "symmetrical" are not limited, in the strict sense, defined as geometry, but extend to geometric positions which are close, i.e. which accept a certain tolerance in the technical field in question, without impact on the result obtained. This tolerance is, in particular, introduced by the adverb "substantially", without this term being necessarily repeated before each adjective.

In reference to the figures, the magnetocaloric generator 1 according to the invention, also called "generator 1" below, comprises a set of MCM-based active elements 2 and a magnetic arrangement 3, relatively movable against one another. In the example of a preferred embodiment of the invention represented, the magnetic arrangement 3 is movable with respect to the set of active elements 2 which is fixed, making it possible to greatly simplify the heat-transfer fluid system. The generator 1 further comprises a heat-transfer circuit to thermally couple the active elements to at least one device or one external application (not represented) by way of at least one heat exchanger (not represented), as described, for example, in the publications of the applicant mentioned above. The heat-transfer circuit can comprise a heat-transfer fluid or a solid heat-transfer fluid (not represented) such as that described in publication WO 2022/112391 A1. The invention particularly relates to the pumping of heat from a cold source to a hot source for producing heat and/or refrigeration from mechanical or electrical energy, by using the transition properties of magnetic phases of the Magnetocaloric Materials called MCM below, under the effect of a magnetic field variation in the vicinity of their transition temperature, also called Curie temperature or critical temperature (Tc). It also relates to the conversion of thermal energy available in the form of a temperature difference, into mechanical or electrical energy, by using the same properties of the MCM materials under the effect of a temperature variation. Thus, the generator 1 of the invention constitutes an energy conversion machine which can be reversible, i.e. which can operate according to two reserve operating modes according to the input energy.

Figure 3:
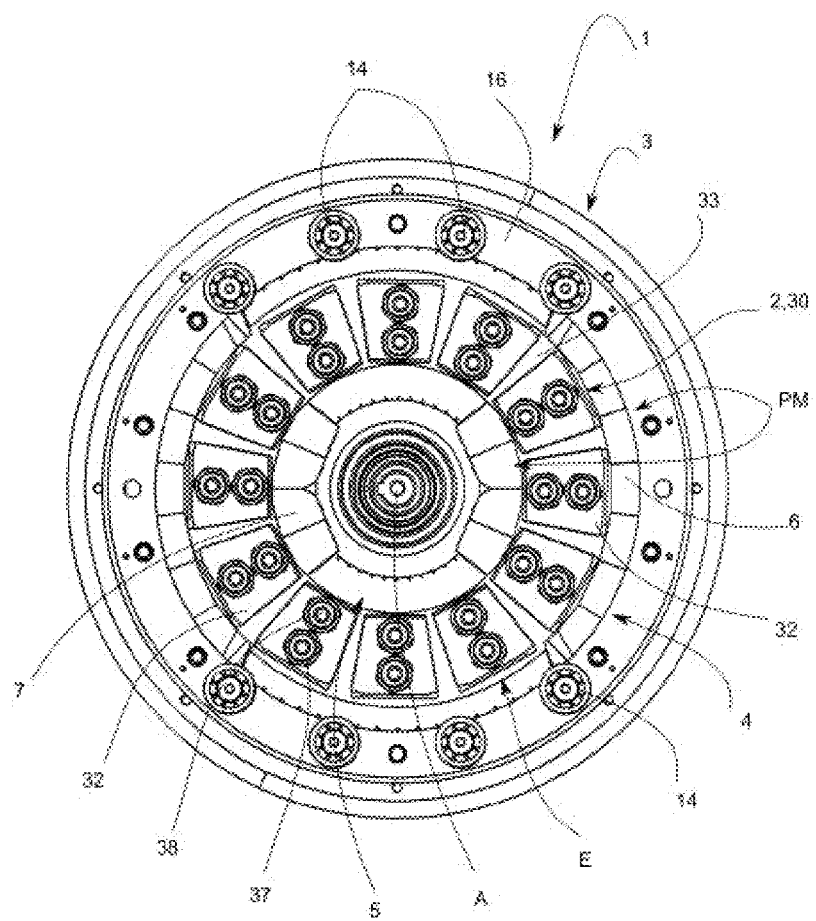
FIG. 3 is a side view of a generator according to the invention, represented by its magnetic arrangement and its active elements.

In the example represented, the generator 1 is represented in a cylindrical configuration, and the magnetic arrangement 3 comprises or is formed of two superposed magnetic rotors and concentric about an axis of rotation A along X, an external magnetic rotor 4 and an internal magnetic rotor 5 of which together delimiting an annular interval, called air gap E. The external magnetic rotor 4 and the internal magnetic rotor 5 comprise one same number of magnetic poles PM, of which at least two magnetic poles PM (FIGS. 3 and 6), four magnetic poles PM (FIGS. 1, 4, 5), or a number of magnetic poles PM greater than four as needed. The magnetic poles PM of each rotor 4, 5 are regularly distributed at the circumference of each of the rotors 4, 5, each extend over an angular sector of the same value, and occupy substantially the equivalent of half of the circumference of the rotor 4, 5. The remaining half of the circumference of the rotor 4, 5 is occupied by vacuum zones (outside of magnetic field) (FIGS. 1 and 6) or comprising a non-magnetic and thermally and/or electrically insulating material (FIG. 3). Furthermore, the magnetic poles PM of the two rotors 4, 5 are aligned in pairs to generate a continuity of magnetic field lines in each pair of magnetic poles PM of the external magnetic rotor 4 and of the internal magnetic rotor 5. Thus, the magnetic field lines are concentrated in the air gap E between each pair of magnetic poles PM creating zones under the field. This magnetic field concentration has the effect of maximising the intensity of the field in the zones under the field and maximising the variation of the field between the zones under the field and the zones outside of the field. Each magnetic pole PM comprises or is formed of one or more magnetic generators 6, 7, such as permanent magnets, electromagnets, superconductors, or any other compatible magnetic generator. If they comprise or are formed of several magnetic generators 6, 7, as represented in FIGS. 1, 3, 6, then they are coupled to one another to create a continuous and uninterruptible magnetic pole PM.

Figure 6:
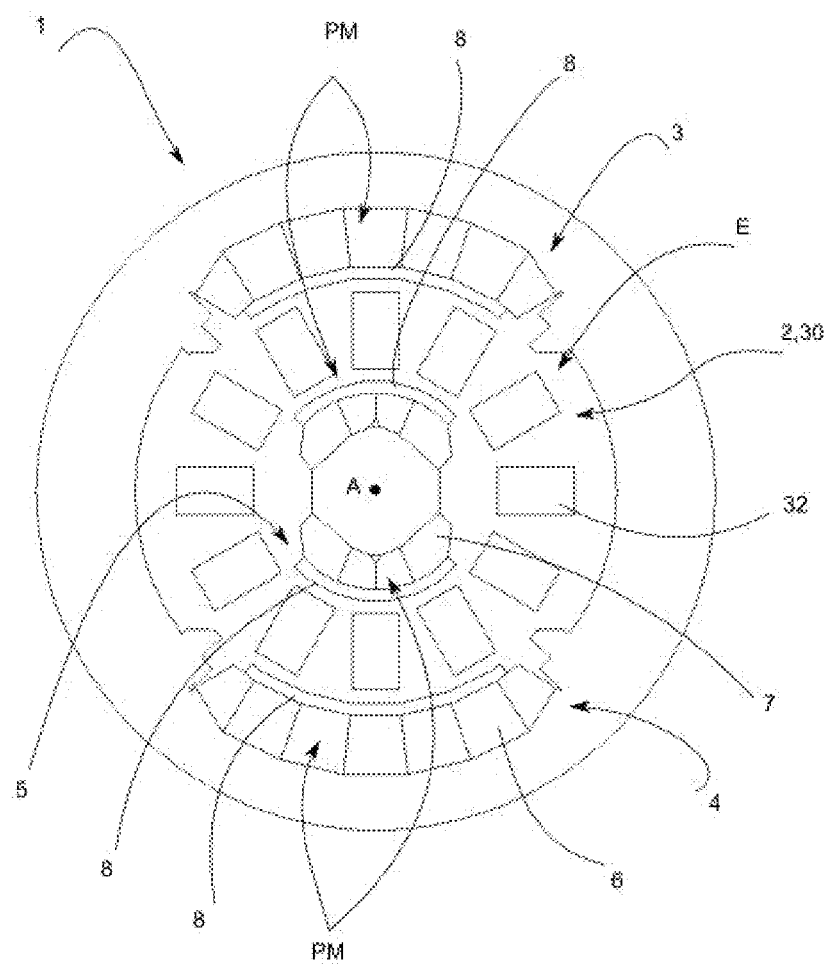
FIG. 6 is a simplified side view of a generator according to a variant of the invention, and similar to FIG. 3.

In a variant of an embodiment illustrated in FIG. 6, the magnetic arrangement 3 further comprises a magnetic field uniforming device 8 arranged to uniform and regularise the magnetic field produced by the magnetic poles PM, and correlatively, to also increase the magnetic performance of the magnetic poles PM and therefore the effectiveness and the power of the generator 1. For example, the magnetic performance of the magnetic poles PM can be increased by at least 30% via the uniforming device 8, without this value being limiting. In the example represented, the magnetic field uniforming device 8 is presented in the form of a sheet or of a plate, arranged to cover the end of each of the magnetic poles PM of the external magnetic rotor 4 and/or of the internal magnetic rotor 5 facing the air gap E. The magnetic field uniforming device 8 can have any other shape favourable to the uniforming the magnetic field in the zones under the field within the air gap E, without limitation of shape, such as a prismatic shape, etc. The uniforming device 8 is profiled to approach the shape of the profile of the magnetic poles PM and/or of the active elements 4. It can be added to the ends of the magnetic poles PM by gluing or by any other definitively equivalent fixing method. The uniforming device 8 can be made of a low-carbon-ratio steel, pure iron, and of any other ferromagnetic material. As an example, it can have a thickness of between 2 mm and 5 mm, constant or not, and without this range of values being limiting.

The external magnetic rotor 4 and the internal magnetic rotor 5 are coupled to one another to rotate in one same direction of rotation and synchronously about the axis of rotation A. They can be coupled by a mechanical transmission, such as a gear train, a belt and pulley system, a chain and pinion system, or similar. They can be coupled by an electronic transmission if each rotor is coupled to a motorisation. Preferably, they can be magnetically coupled, i.e contactless, thus avoiding efficiency losses by friction. The technical effect of this principle of driving the two rotors makes it possible to utilise the maximum potential energy (BHmax) of the magnets forming the magnetic poles at each instant. The field lines follow a continuous path, as homogeneous and concentrated as possible and continuously looping straddling on the inner 5 and outer 4 rotors, synchronously rotating with respect to the active elements 2 located in the air gap E. The rotors 4 and 5 are magnetically synchronous since they are immovable against one another, thanks to their magnetic coupling. The magnetic arrangement 3 is consequently the seat of a magnetic field which is stationary with respect to itself, which rotates with respect to the fixed stator 30 generating an alternation between zones under the field and zones outside of the field also with transition phases which are as short as possible.

Figure 1:
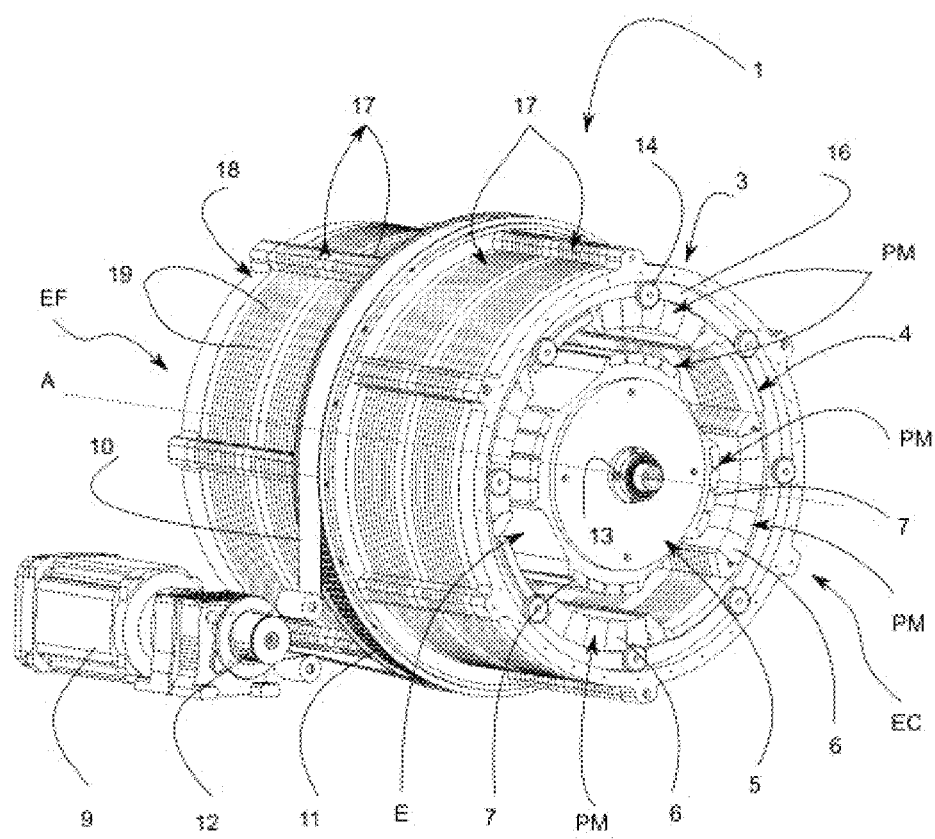
FIG. 1 is a perspective view of a magnetocaloric generator according to the invention, represented by its magnetic arrangement and its rotary drive system.
Figure 1:
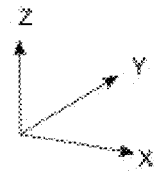

In the preferred embodiment of the invention, the external magnetic rotor 4 is rotated by an electrical machine 9 and itself drives the internal magnetic rotor 5 by magnetic coupling, such as represented in FIG. 1. Naturally, the reverse configuration can be suitable, i.e. that the internal magnetic rotor 5 is driven by the electrical machine 9 and itself drives the external magnetic rotor 4 by magnetic coupling. However, the effectiveness of the magnetic coupling is clearly greater in the example represented, as the mechanical inertia of the external magnetic rotor 4 is greater than that of the internal magnetic rotor 5. Thus, an external mechanical driving makes it possible to limit the oscillating phenomena in case of driving by magnetic coupling of the internal magnetic rotor 5.

The electrical machine 9 can be constituted by any type of motor or any type of alternator according to the operating mode of the magnetocaloric generator. In the example represented, the electrical machine 9 is coupled to the external magnetic rotor 4 by a mechanical transmission. Still in the example represented, this mechanical transmission preferably comprises a toothed belt 10 which meshes a toothed ring 11 provided at the periphery of the external magnetic rotor 4. Naturally, any other type of mechanical transmission can be suitable, but the transmission by toothed belt 10 has the advantage of being precise, reliable and silent. Furthermore, the reduction ratio between the toothed pulley 12 at the outlet of the electrical machine 9 and the toothed ring 11 of the external magnetic rotor 4 is significant and makes it possible to remove the reducer between the electrical machine 9 and the external magnetic rotor 4, also improving the energy efficiency of the generator 1. The electrical machine 9 can thus be sized best to reach the optimal operating point of the generator 1.

Figure 9:
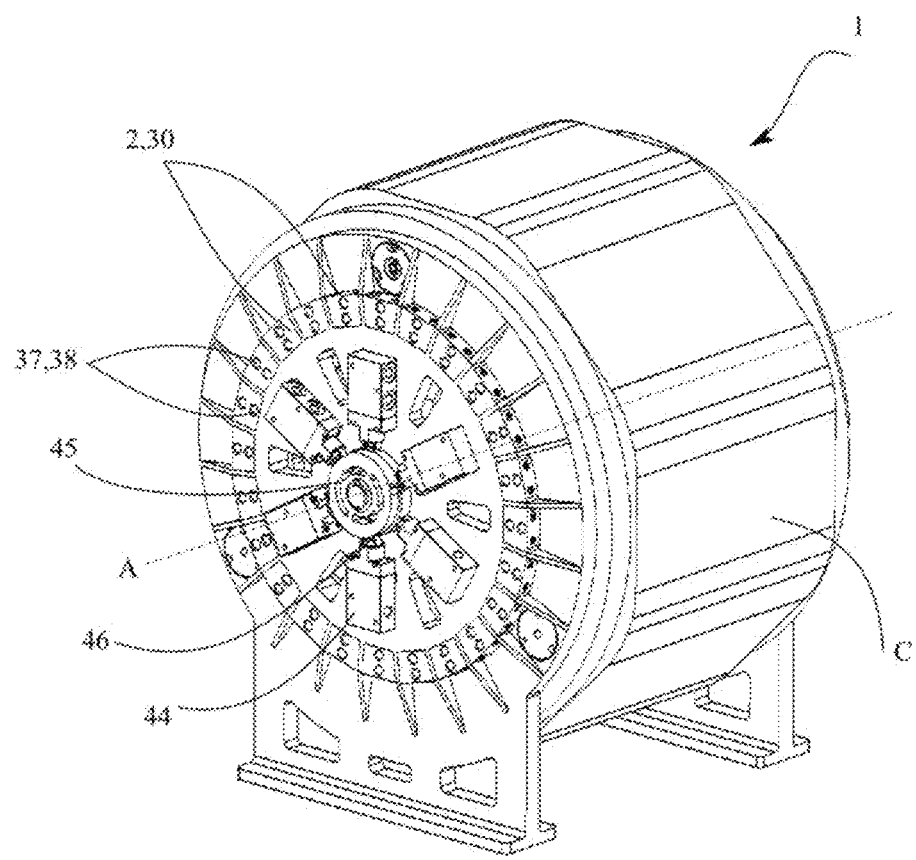
FIG. 9 is a perspective view of a generator according to the invention, streamlined and seen from an axial end comprising a system for controlling the heat-transfer circuit.

The two rotors 4, 5 are rotatably guided about their axis A by guiding means carried by a casing C (FIG. 9). They are further stopped in translation along X by any suitable blocking means (not represented). The internal magnetic rotor 5 can be rotatably guided by any known means, and for example, by means of two bearings 13 provided in its end zones (FIG. 1). The external magnetic rotor 4 is itself preferably rotatably guided by a series of guiding members 14, small comparatively to the average diameter of said rotor, disposed at the periphery, fixed in the ends of said rotor. In the example represented, the guiding members 14 are presented in the form of rotary rollers arranged to circulate over a guiding path belonging to the casing C (FIG. 9). This solution is particularly advantageous, as it enables one rotary guiding of the external magnetic rotor 4 per bearing and therefore without friction, effective, reliable, which does not generate heat, therefore which does not consume energy. Furthermore, this solution is economical given the low cost price of this type of guiding members 14, which are parts available on the market. It is also universal, as it is suitable for all sizes of the generator 1, therefore for all diameters of the external magnetic rotor 4. However, this example is not limiting and any other equivalent or suitable type of guiding members, such as low-friction-coefficient runners can be suitable. Furthermore, the peripheral arrangement of the guiding members 14 makes it possible to release the entire central part of the generator 1, and in particular in its hot EC and cold EF ends to house the heat-transfer circuit there (FIG. 9). This arrangement enables a better compactness of the generator 1.

The guiding members 14 can be disposed regularly at the periphery of the external magnetic rotor 4 (FIG. 1), or preferably outside of the magnetic poles PM (FIGS. 2 and 3), which facilitates their mounting and guarantees a frictionless operation and limits the eddy currents within them. The guiding members 14 can be mounted on flanges 16 added in the ends of the external magnetic rotor 4. The guiding path can be provided directly on the casing C or in a guiding ring 15 added to the casing C. The guiding ring 15 can thus be made of a material different from that of the casing C, and in particular, a material, the hardness of which is greater than that of the material of the casing C, like a stainless steel guiding ring for an aluminium casing C, without this example being limiting, making it possible to optimise the choice and the costs of raw material according to their function. The arrangement of the guiding members 14 enables the balancing of the radial forces, while the guiding path or the guiding ring 15 can be configured to form the translation stopping means along X of the external magnetic rotor 4, with or without friction.

The magnetic arrangement 3 can be of one-piece construction or preferably or modular construction, according to the variant of the embodiment illustrated. The modular construction makes it possible to facilitate and rationalise the manufacture of the generator 1 to meet the specifications and the applications targeted, making it possible to lengthen the generator 1, without increasing its diameter. The magnetic arrangement 3 comprises, in reference to FIGS. 1, 2, 4 and 5, an assembly of at least two axially superposed basic modules 17, the number of basic modules 17 of the magnetic arrangement 3 determines the length of the magnetic arrangement 3, itself determined according, in particular, to the power and/or the temperature difference targeted for the generator 1.

Each basic module 17 comprise a portion of the external magnetic rotor 4 and a portion of the internal magnetic rotor 5. Naturally, the basic modules 17 of each rotor are managed separately, given that the two rotors are physically independent parts. More specifically, FIG. 4 illustrates an assembly of two superposed basic modules 17 of the two rotors 4, 5 represented without the magnets 6, 7.

Figure 5:
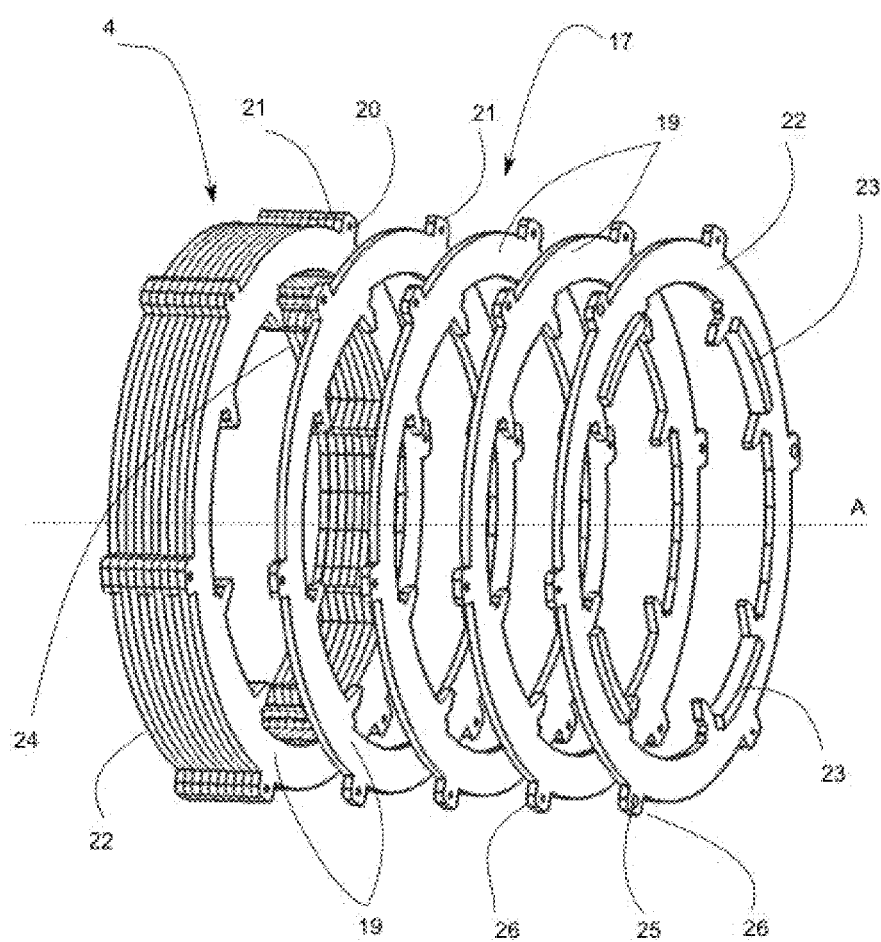
FIG. 5 is an exploded, perspective view of a basic module of FIG. 4.

FIG. 5 illustrates a basic module 17 only showing that the external magnetic rotor 4 represented without the magnets 6. Each basic module 17 comprises the magnetic shell 18 of the external magnetic rotor 4, which can be made of one single part or of several parts, like stacks of cut sheets, and optionally electrically insulated, in order to prevent the formation of eddy currents which would result from a magnetic flow variation caused by the active elements 2. In the example represented, the magnetic shell 18 is constituted of a plurality of basic magnetic sheets 19, from a few millimetres to a few centimetres, and for example, between 0.5 mm and 10 mm, without these values being limiting. The basic magnetic sheets 19 are cut or stamped, axially stacked and assembled to one another by fixing members (not represented) through orifices 20 provided in corresponding lugs 21. Naturally, any other equivalent fixing means can be suitable. The method for manufacturing by stacking basic magnetic sheets 19, makes it possible to optimise the production tools and the quantity of raw material used, for more flexibility in the design of the magnetic assembly 3 and an overall lesser production cost. The axial length of the basic modules 17 about the axis X can thus be modulated as needed.

The basic modules 17 of each rotor further comprise complementary interlocking shapes arranged to, on the one hand, centre the basic modules 17 with respect to the axis of rotation A and index the angular position of the basic modules 17 against one another. In the example illustrated in FIGS. 4 and 5, each basic module 17 of the external magnetic rotor 4 is framed by two end magnetic sheets 22, which can have a thickness greater than that of the basic magnetic sheets 19, and which comprise the complementary interlocking shapes. These complementary interlocking shapes comprise, in one of the end magnetic sheets 22 of each basic module 17, a male interlocking shape, in the form of an axially projecting ridge 23, rotated towards the outside of said module, split into four angular sectors regularly distributed between the magnetic poles PM of the external magnetic rotor 4. Correspondingly, in the end magnetic sheet 22, opposite each basic module 17, the complementary interlocking shapes comprise a female interlocking shape, in the form of an axially projecting groove 24, rotated towards the inside of said module, split into four angular sectors regularly distributed between the magnetic poles PM of the external magnetic rotor 4. Naturally, any other equivalent complementary interlocking shape can be suitable, including any other centring and indexing means.

Figure 4:
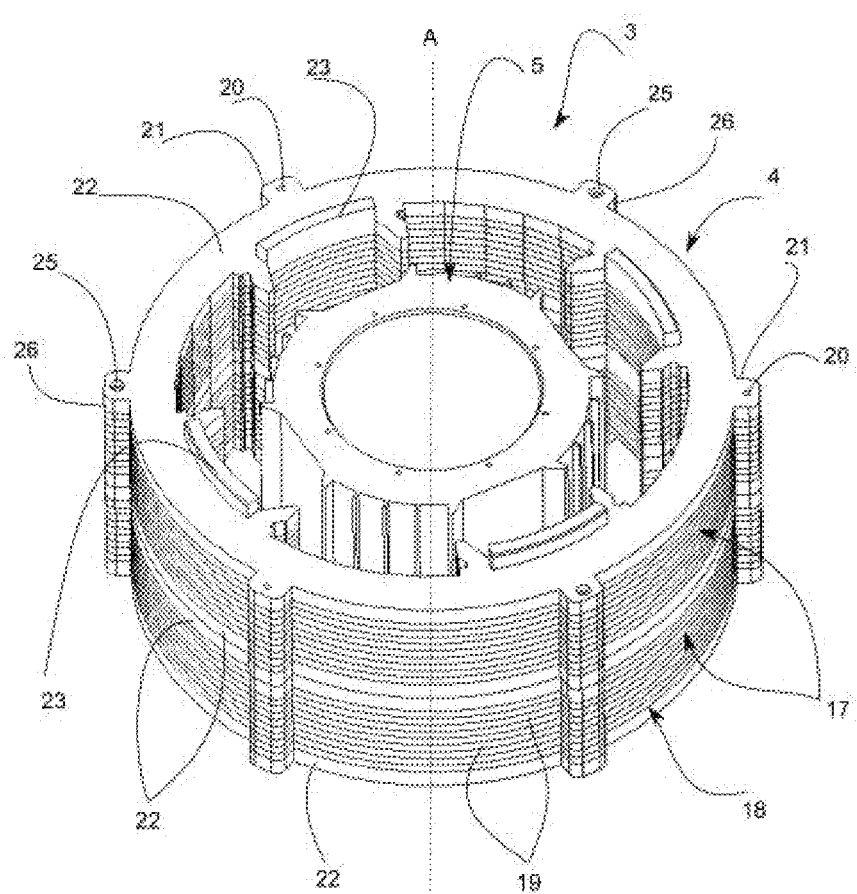
FIG. 4 is a perspective view of a magnetic arrangement of a generator according to the invention, consisting of an assembly of two basic modules.

The basic modules 17 forming all or part of the magnetic arrangement 3 are further assembled to one another by fixing members (not represented), such as threaded rods, bolts, tie rods, screws, through orifices 25 provided in corresponding lugs 26 (FIG. 4). Naturally, any other equivalent fixing means can be suitable, such as welding points or lines between the basic modules. To simplify the mounting, the basic modules 17 can be assembled to one another in groups of two, then the groups of two can themselves be assembled to one another by intermediate flanges, as represented in FIG. 1. Any other assembly method can also be suitable.

The basic modules of the internal magnetic rotor 5 are not represented, but also comprise complementary interlocking, centring and indexing shapes, as well as fixing means. As an example, indexing pins and passage holes for screws can be mentioned, making it possible to perform both the fixing and the holding in relative position of the basic modules to one another. Any other equivalent complementary interlocking shape and any other equivalent fixing means can be suitable.

Figure 2:
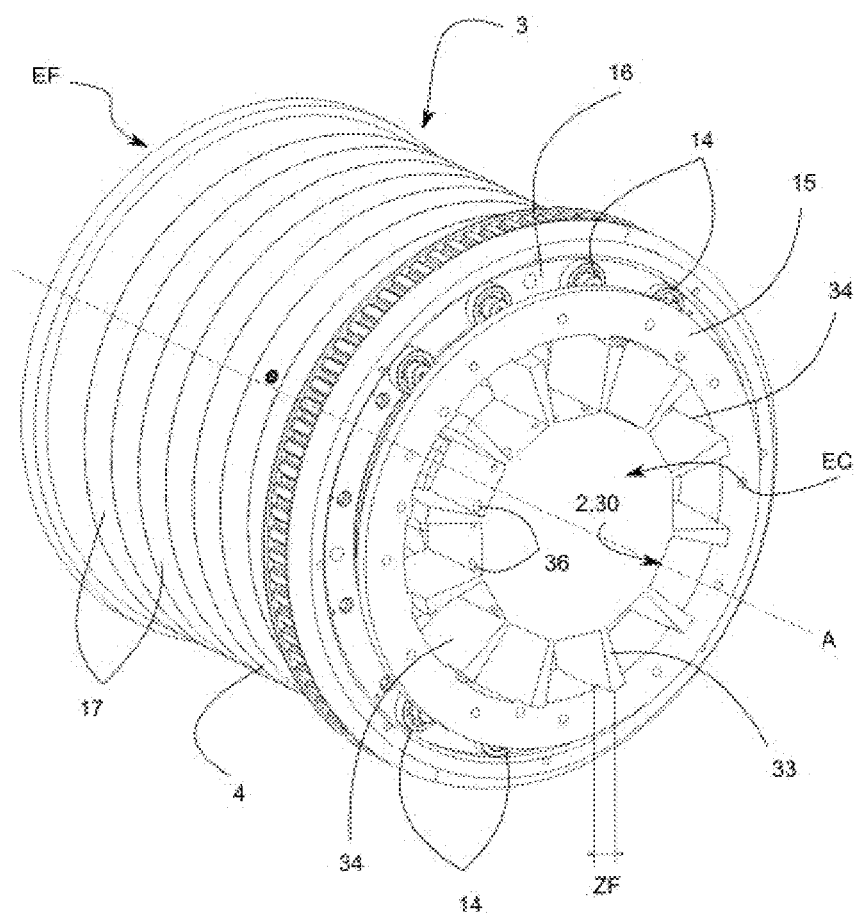
FIG. 2 is a perspective view of a part of a magnetic arrangement and of a support for active elements belonging to a generator according to the invention.

In reference, more specifically, to FIGS. 2, 3 and 6, the set of active elements 2 of the generator 1 of the invention comprises or is formed of a fixed annular stator 30, centred on the axis of rotation A along X, disposed in the air gap E between the external magnetic rotor 4 and the internal magnetic rotor 5. The active elements 2 extend longitudinally in the stator 30 between a hot end EC and a cold end EF of the generator 1, represented symbolically in FIGS. 2 and 7. The active elements 2 are porous and each passed through a heat-transfer fluid, magnetocalorically passive, via a heat-transfer circuit, which enables an axial circulation along X and alternative from said heat-transfer fluid from said hot end EC to said cold end EF and vice versa, so as to perform magneto-thermodynamic cycles within the generator 1.

The axial circulation along X of the heat-transfer fluid is consequently perpendicular to the radial orientation of the magnetic field lines generated by the magnetic poles PM of the magnetic arrangement 3. This arrangement is particularly advantageous, as it enables the active elements 2 to perform magneto-thermodynamic cycles, thanks to the alternative movement of the heat-transfer fluid synchronised with the magnetic field variations between the zone under the field and zones outside of the field, without interference between magnetic circuit and heat-transfer circuit.

The active elements 2 are preferably disposed side-by-side over the circumference of the stator 30 to maximise the quantity of MCM material present in the volume of the air gap E. With this in mind, the space between two consecutive active elements 2 is chosen to be as narrow as possible in order to reduce to its minimum, the non-magnetocaloric material volume in the magnetic circuit disposed in the air gap E, to favour a rotation movement of the magnetic arrangement 3 as smooth and continuous as possible, requiring a rotation torque as uniform as possible, and inducing a reduction of jerks and energy consumption.

The active elements 2 are further distributed regularly, separated circumferentially from one another by a fixed step, and the number of active elements 2 is preferably the multiple of the number of magnetic poles PM of the magnetic arrangement 3. Thus, at each moment of each thermodynamic work cycle, the active elements 2 are divided into two groups which are equal in number: a group of active elements 2 located in the zones under the magnetic field facing the magnetic poles PM and a group of active elements 2 located in the zones outside of the magnetic field, outside of the magnetic poles PM. This particular arrangement within the generator 1 enables a good distribution between the zones under the field and the zones outside of the field, and thus to be able to optimise the thermodynamic cycle.

Figure 7:
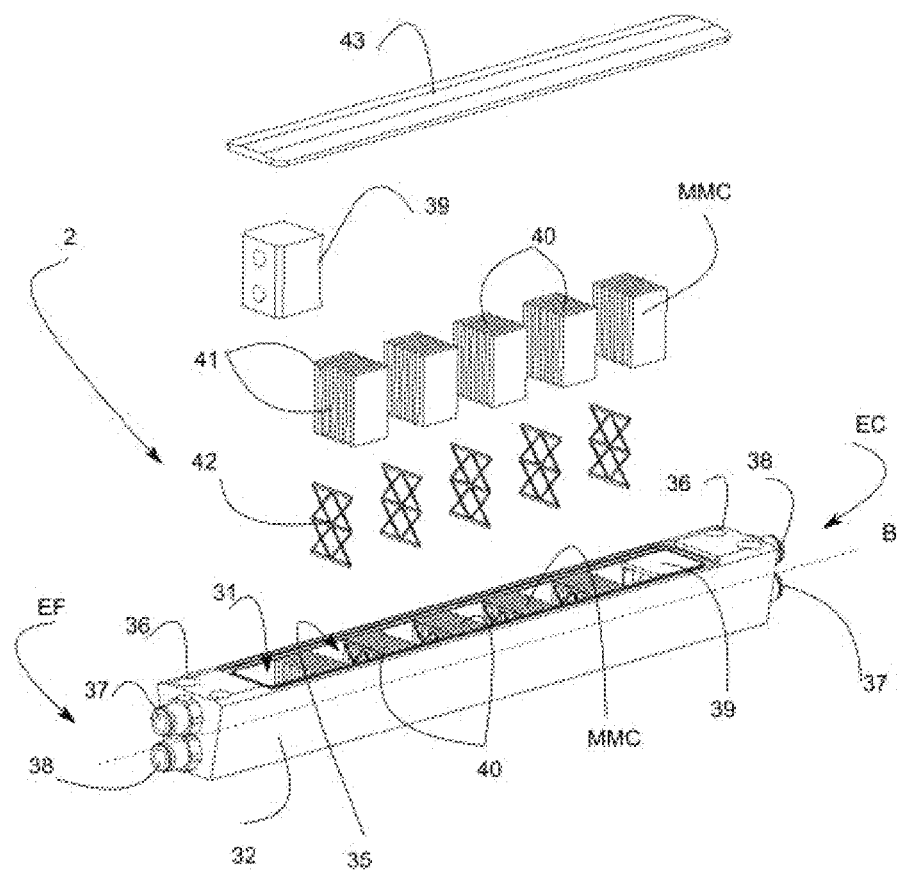
FIG. 7 is an exploded view of an active element of a generator according to the invention.
Figure 8:
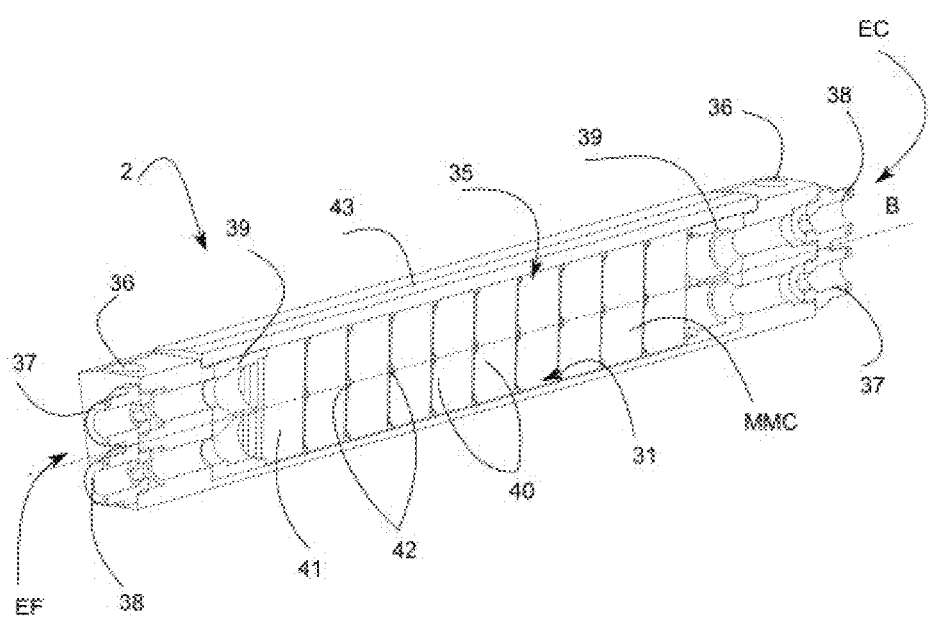
FIG. 8 is a longitudinal, cross-sectional view of the active element of FIG. 7.

In reference more specifically to FIGS. 7 and 8, each active element 2 is presented in the form of an independent bar, and comprises a material carrier 32 which is longitudinal along X. The material carrier 32 is preferably made of a slightly thermally conductive and electrically insulating material, such as, as a non-limiting example, a polymer-based synthetic material, a carbon fibre-based composite material, a stainless steel, a silica- or resin-based natural material, or similar. It can optionally be thermally insulated at least one its upper and lower faces with respect to the magnetic rotors. Each active element 2 is arranged to be housed axially in the stator 30 directly or in a support 33 comprised in or forming said stator 30. An example of a support 33 is represented in FIG. 2 and comprises mounting rails 34 extending axially along X and distributed regularly over the circumference of the stator 30. The mounting rails 34 are each defined by a U-shaped wall, without this shape being limiting. The support 33 is preferably made of a magnetically neutral and electrically non-conductive material, such as, as a non-limiting example, a polymer-based synthetic material, a carbon fibre-based composite material, a stainless steel, a silica- or resin-based natural material, or similar. In the example represented in FIG. 2, the support 33 is formed of one single annular part. This example is not limiting, as the support 33 can be formed of several parts assembled side-by-side, each part extending over an annular sector, being able to correspond to the annular sector of the magnetic poles PM. The support 33 is not essential, as the material carriers 32 could comprise, in their side walls, complementary interlocking means making it possible to assemble them to one another, by means of a sliding connection along X.

In the example represented, the support 33 of the stator 33 has a length greater than that of the rotors 4, 5 to provide at least one fixing zone ZF located outside of the magnetic arrangement 3, at least at one of the ends of said stator 30. Thus, the material carriers 32 can be introduced and extracted easily from the stator 30, and can further be fixed by screws or any other dismountable fixing member, in fixing holes 36 provided for this purpose in the material carriers 32 and the support 33. Rapid clip fixing means or similar can also be suitable.

The material carriers 32 have a cross-section chosen from among a square, a rectangle, a trapezium, a hollow cylinder segment. In the example represented, the cross-section of the material carriers 32 is trapezoidal to optimise the useful volume of the stator 30. The length of the material carriers 32 is dependent on the length of the magnetic arrangement 3, which is determined according to the power and/or the temperature difference targeted for the generator 1. The longitudinal design along X of the magnetic arrangement 3 and of the active elements 2 is advantageous since it makes it possible to facilitate and to rationalise the manufacture of the generator 1 to meet the specifications and the targeted applications, in variable temperature ranges, without increasing its diameter, by playing on the number of basic modules 17 of the magnetic arrangement 3 assembled in series, and therefore over the axial length of the generator 1 about the axis X.

The material carrier 32 of each active element 2 comprises an inner housing 35 arranged to receive at least one porous MCM material forming a set of channels 31 enabling the two-directional axial circulation of the heat-transfer fluid through said at least one MCM. In the example presented, the heat-transfer fluid is a fluid. The material carrier 32 thus comprises at least one fluid connector 37, 38 at each of its ends to connect the active element 2 to the heat-transfer circuit (not represented). In the example represented, the material carrier 32 comprises two fluid connectors 37, 38 in each of its ends, corresponding respectively to a fluid inlet 37 and to a fluid outlet 38. With the active elements 2 being fixed, the fluid connectors 37, 38 are advantageously simple, non-rotating and therefore sealed connectors, as not likely to generate leakages. The material carrier 32 also comprises a distributor 39 in each end zone between the fluid connector(s) 37, 38 and the inner housing 35 to distribute the heat-transfer fluid in all of the channels 31.

In the example represented, the MCM contained in each material carrier 32 is presented in the form of one or more porous MCM blocks 40 having an amorphous or organised structure. Each porous MCM block 40 can be constituted of material strips or of any other material structures, whether regular or not. In each porous MCM block 40, according to the example represented, the material structures 41 are advantageously in the form of strips, preferably oriented axially along X parallel to the longitudinal axis B of the material carrier 32. The strips also extend radially and parallel to the magnetic field lines in the air gap E. The axial orientation along X of the material structures 41 enables the alternative circulation of the heat-transfer fluid between the cold EF and hot EC ends of the generator 1. And the radial orientation of the material structures 41 makes it possible to cut the eddy currents and to reduce the local demagnetising field. The terms "axial" and "radial" used are specific to the cylindrical configuration of the generator 1 such as illustrated, but extend respectively to the terms "longitudinal" and "transverse" for a generator 1 of linear configuration, not represented.

Furthermore, the material structures 41 in the form of strips are spaced apart from one another by an interval (which cannot be seen), the intervals forming the set of channels 31 enabling the two-directional axial circulation along X of the heat-transfer fluid. The intervals between the material structures 41 form flat and narrow fluid passages, of regular cross-section, making it possible to favour a fluid flow of the heat-transfer fluid along X through the generator 1.

The porous MCM blocks 40 can be made from one same MCM, or from different MCMs or also from different MCM compositions. The porous MCM blocks 40 constituted of different MCMs can be, or not, separated from one another by joining blocks 42. Furthermore, the different MCMs or MCM compositions will be preferably stored or ordered according to an increasing Curie temperature (Tc) from a cold source located at the cold end EF to a hot source located at the hot end EC, evolving stepwise or continuously, to enable the matching of the Tcs to the temperature gradient (difference), formed in the MCM volumes of the generator 1.

In a variant not represented, the MCM contained in each material carrier 32 can also be presented in the form of one or more porous MCM blocks, obtained by sintering, for example, the pores constituting the fluid passages for the heat-transfer fluid.

The material carriers 32 further comprise a cover 43 to sealingly close the inner housing 35. The material carriers 32 and the mounting rails 34 provided in the support 33 can comprise guiding means in axial translation (not represented) in their corresponding walls, such as grooves, ridges, or similar. The material carriers 32 together could also comprise assembly and/or guiding means in axial translation (not represented) in their corresponding walls, if they are mounted without the support 33.

The longitudinal configuration of the active elements 2 along X is particularly advantageous, as it makes it possible to have the fluid connectors 37, 38 or any other thermal or mechanical connection with the cold and hot sources in one of the axial ends or in the two axial ends of the stator 30, as needed. The fluid connectors 37, 38 are thus located in the proximity of the distributors 44 (FIG. 9) provided in one of the axial ends or in the two axial ends of the generator 1, making it possible to reduce to its minimum, the length of the pipes of the heat-transfer circuit and the radial bulk of the generator 1.

In the case of a heat-transfer fluid, taken as an example and in a non-limiting manner, the distributors 44 are controlled according to a switching frequency determined according to the frequency of the thermodynamic work cycles, synchronously with the zones under the field and the zones outside of the field, by an actuator chosen from among mechanical, hydraulic, electrical and/or electronic actuators. The distributors 44 can be directly controlled by the rotation of the magnetic arrangement 3 by means, for example, of a cam 45 secured to the internal 5 or external 4 magnetic rotor, which makes it possible to actuate the distributors 44 by compartments 46, as represented in FIG. 9. Any other equivalent means for controlling the distributors 44 can be suitable.

The longitudinal design along X of the active elements 2 consequently offers several advantages: facilitating the manufacture of the active elements 2 in the form of independent bars, simplifying the mounting and the dismounting of the active elements 2 in the stator 30, standardising the components such as the porous MCM blocks 40, and reducing the cost prices, simplifying the heat-transfer circuit and reducing the load losses by shortening the pipes.

Generally, the longitudinal design along X of the magnetic arrangement 3 and of the active elements 2 further makes it possible to easily increase the power and/or the work temperature difference of the generator 1 by increasing the length of the magnetic arrangement 3 and the length of the active elements 2, therefore the total length of the generator 1, without increasing its radial dimension, which is advantageous in terms of compactness and of bulk of the generator 1.

The generator 1 according to the invention is represented in a cylindrical configuration provided with a rotary magnetic arrangement 3, without this example being limiting. A linear configuration can absolutely be considered, wherein the stator 30 and the rotors 4, 5 are flattened and the rotors 4, 5 are linearly moved, in alternative translation with respect to the stator 30. Naturally, the cylindrical configuration makes it possible to move the rotors 4, 5 in a continuous rotation movement, a lot more effective energy-wise, simpler and less expensive to achieve.

The present invention is naturally not limited to the examples of embodiments described, but extends to any modification and variant which are clear for a person skilled in the art within the limit of the accompanying claims. Furthermore, the technical features of the different embodiments and variants mentioned above can be, totally or for some of them, combined with one another.

The invention claimed is:

1. A magnetocaloric generator, comprising a set of active elements based of Magnetocaloric Materials, and a magnetic arrangement arranged to be movable with respect to said set of active elements, said magnetic arrangement comprising two superposed magnetic rotors, namely an external magnetic rotor and an internal magnetic rotor delimiting an air gap between them, said external magnetic rotor and said internal magnetic rotor comprising one same number of magnetic poles, said set of active elements constituting a stator disposed in said air gap, and said active elements extending longitudinally in said stator between a hot end and a cold end of said generator, wherein one of said external or internal magnetic rotors is coupled, on the one hand, to an electrical machine by a mechanical coupling, and on the other hand, to the other of said internal or external magnetic rotors by a magnetic coupling, such that said rotors move in one same direction and are magnetically synchronous.

2. A magnetocaloric generator according to claim 1, wherein said generator has a cylindrical configuration, wherein the external and internal magnetic rotors are concentric about their axis of rotation, and wherein said stator has an annular shape, concentric with said external and internal magnetic rotors.

3. A magnetocaloric generator according to claim 2, wherein said external magnetic rotor is coupled to said electrical machine, wherein the external magnetic rotor comprises a peripheral toothed ring, and wherein said mechanical coupling between said external magnetic rotor and said electrical machine comprises a transmission by toothed belt meshing said toothed ring.

4. A magnetocaloric generator according to claim 2, wherein said generator comprises at least means for rotatably guiding said external magnetic rotor and said internal magnetic rotor carried by a casing, and wherein said means for rotatably guiding said external magnetic rotor comprise peripheral guiding members, mounted in the ends of said external magnetic rotor, and arranged to circulate over a guiding path belonging to said casing.

5. A magnetocaloric generator according to claim 4, wherein said guiding members are mounted on said external magnetic rotor in peripheral sectors located outside of said magnetic poles.

6. A magnetocaloric generator according to claim 4, wherein said guiding path is provided on a guiding ring added to said casing, said guiding ring being of a material of hardness greater than that of the material of said casing.

7. A magnetocaloric generator according to claim 1, wherein said magnetic arrangement is of modular construction and comprises an assembly of at least two superposed basic modules, wherein each basic module comprises a portion of said external magnetic rotor and a portion of said internal magnetic rotor, and wherein the number of basic modules defines the length of said magnetic arrangement and is determined according to the power and/or to the temperature difference targeted for said generator.

8. A magnetocaloric generator according to claim 7, wherein said basic modules comprise complementary interlocking shapes arranged, on the one hand, to centre said basic modules with respect to said axis of rotation and index the angular position of said basic modules against one another.

9. A magnetocaloric generator according to claim 1, wherein said magnetic arrangement comprises, facing said air gap, a magnetic field uniforming device superposed to said magnetic poles of said external magnetic rotor and/or said internal magnetic rotor.

10. A magnetocaloric generator according to claim 1, wherein said active elements are porous and each passed through by a heat-transfer circuit enabling an alternative circulation of a heat-transfer fluid from said hot end to said cold end in a first work cycle, and conversely, from said cold end to said hot end in a second work cycle of said generator, and wherein the orientation of the circulation of the heat-transfer fluid is perpendicular to the orientation of the magnetic field lines generated by said magnetic poles of said magnetic arrangement.

11. A magnetocaloric generator according to claim 10, wherein the number of active elements of said assembly is a multiple of the number of magnetic poles of said magnetic arrangement, and wherein said active elements are disposed side-by-side over the circumference of said stator.

12. A magnetocaloric generator according to claim 10, wherein each active element comprises a longitudinal material carrier, housed in said stator, wherein the material carriers have a cross-section chosen from among a square, a rectangle, a trapezium, a hollow cylinder portion, and wherein the length of said material carriers is determined according to the length of said magnetic arrangement and to the power, to the effectiveness and/or to the temperature difference targeted for said generator.

13. A magnetocaloric generator according to claim 12, wherein the material carrier of each active element comprises an inner housing arranged to receive at least one MCM, and at least one fluid connector at each of the ends of the material carrier, arranged to connect said active element to said heat-transfer circuit.

14. A magnetocaloric generator according to claim 13, wherein said material carrier further comprises at least one distributor in each end zone between said fluid connector and said inner housing.

15. A magnetocaloric generator according to claim 10, wherein said active elements comprise at least one porous MCM block in the form of regular material strips or structures, oriented parallel to the longitudinal axis of said material carrier, and spaced apart from one another by an interval, the intervals forming a set of longitudinal channels enabling a two-directional circulation of said heat-transfer fluid through each active element.

16. A magnetocaloric generator according to claim 15, wherein said active elements comprise several porous MCM blocks, each consisting of one same MCM or of different MCMs or also of different MCM compositions, the different MCMs or MCM compositions being stored according to an increasing or decreasing Curie temperature evolving stepwise or continuously.

* * * * *